United States Patent
Jeong

(10) Patent No.: US 9,548,782 B1
(45) Date of Patent: Jan. 17, 2017

(54) SMART PHONE HOLDER FOR VEHICLE

(71) Applicants: Hyundai Motor Company, Seoul (KR); Kia Motors Corporation, Seoul (KR)

(72) Inventor: YuSeorg Jeong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/941,966

(22) Filed: Nov. 16, 2015

(30) Foreign Application Priority Data

Jul. 1, 2015 (KR) .................. 10-2015-0094300

(51) Int. Cl.
*H04B 1/38* (2015.01)
*H04B 1/3877* (2015.01)
*H04B 1/3822* (2015.01)
*H04M 1/04* (2006.01)

(52) U.S. Cl.
CPC .......... *H04B 1/3877* (2013.01); *H04B 1/3822* (2013.01); *H04M 1/04* (2013.01)

(58) Field of Classification Search
CPC .................... B60R 11/0241; B60R 2011/0042; B60R 11/00; H04B 1/3822
USPC .......... 455/575.1, 575.9, 569.1, 569.2, 575.6
See application file for complete search history.

(56) References Cited

U.S. PATENT DOCUMENTS

| | | | |
|---|---|---|---|
| 7,403,613 B2 * | 7/2008 | Liou ...................... | B60R 11/00 379/446 |
| 8,991,670 B2 * | 3/2015 | Matsuoka ............ | F16M 11/041 224/276 |
| 9,281,857 B1 * | 3/2016 | Lundsgaard ......... | H04B 1/3877 |
| 2010/0060532 A1 * | 3/2010 | Kuang .................. | H01Q 1/084 343/713 |
| 2011/0304963 A1 * | 12/2011 | Luksik ................ | B60R 11/0241 361/679.01 |
| 2012/0267061 A1 * | 10/2012 | Fan ........................ | B60R 11/00 160/368.1 |

FOREIGN PATENT DOCUMENTS

| | | |
|---|---|---|
| CN | 204172806 U | 2/2015 |
| JP | 2014-044692 A | 3/2014 |
| JP | 2014-172528 A | 9/2014 |
| KR | 10-2014-0004438 A | 1/2014 |

* cited by examiner

*Primary Examiner* — John J Lee
(74) *Attorney, Agent, or Firm* — Morgan, Lewis & Bockius LLP

(57) ABSTRACT

A smart phone holder which is mounted to a fixed structure of a vehicle body at a front side of a vehicle to support a smart phone may include a fixing link fixedly mounted to the fixed structure of the vehicle body, and first, second, and third link members forming a four-node link structure with the fixing link together and configured to move the smart phone frontward or rearward of the vehicle by a linkage operation thereof.

12 Claims, 5 Drawing Sheets

SMART PHONE HOLDER FOR VEHICLE

CROSS-REFERENCE TO RELATED APPLICATION

The present application claims priority to Korean Patent Application No. 10-2015-0094300 filed Jul. 1, 2015, the entire contents of which is incorporated herein for all purposes by this reference.

BACKGROUND OF THE INVENTION

Field of the Invention

The present invention relates a smart phone holder. More particularly, the present invention relates to the smart phone holder which is movable from a front side to a rear side by a linkage operation.

Description of Related Art

A supply ratio of a smart phone having function of wireless internet access has become sharply higher than ever. This smart phone lets a driver conveniently utilize audio, video, and navigation functions using the internet through the smart phone.

Recently, as a display of the smart phone has become larger and visibility is improved, utilization of the navigation and the internet is increased. Thus, the number of drivers who utilize the smart phone while driving has increased. In addition, the number of users who use a smart phone holder for supporting the smart phone has also increased.

The smart phone holder is installed in order to utilize or make a call without difficulty. A conventional smart phone holder is attached to a panel such as a dashboard by applying glue or is attached to a front glass by using a suction plate.

Among them, if the smart phone holder is attached by the glue, it may be separated easily and when the user removes the smart phone holder from the vehicle, ingredients of the glue are left on the panel of the vehicle, which spoils the aesthetics of the vehicle. Further, while the remaining glue is removed, the panel of the vehicle may be damaged.

Meanwhile, if the smart phone holder is attached to the front glass by using the suction plate, as a suction force at the suction plate is decreased, the smart phone holder is easily dropped from the front glass by a vibration or an impact on the vehicle. In addition, light which penetrates the front glass is reflected by the smart phone, thus the visibility may deteriorate.

So as to fix the problem of deteriorated visibility, the smart phone holder may be installed inside a cluster. However, when the smart phone is installed inside of the cluster, the driver may put hands through a steering wheel in order to hold or operate the smart phone holder while driving. Therefore, this behavior may threaten safety of the driver.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a smart phone holder which is movable from a front side to a rear side by a linkage operation thereof.

According to various aspects of the present invention, a smart phone holder which is mounted to a fixed structure of a vehicle body at a front side of a vehicle to support a smart phone may include a fixing link fixedly mounted to the fixed structure of the vehicle body, and first, second, and third link members forming a four-node link structure with the fixing link together and configured to move the smart phone frontward or rearward of the vehicle by a linkage operation thereof.

While the first, second, and third members are link-operated, the smart phone which is coupled thereto generally faces a corresponding direction.

One end portion of each of the first and second link members are respectively hinge-connected to both ends of the fixing link to be rotatable, and while the first and second link members are rotated, the third link member may generally be maintained in one direction.

The third link member may include a mounting portion in which the smart phone is coupled, and the mounting portion may be fixed to the third link member and have a predetermined angle compared with the third link member.

The mounting portion may be integrally formed with the third link member.

The second link member may be disposed at an upper side or a lower side of the first link member.

The first link member and the second link member may be respectively formed in an arc shape.

The first link member and the second link member may be equal in length.

When the first, second, and third link members are moved rearward, the mounting portion may be disposed at a side of a steering wheel.

The first, second, and third link members may be configured to be operated at an inside of a cluster of the vehicle and moved rearward by a linkage operation thereof.

The first, second, and third link members may be configured to be operated at a lower side of a cluster and one side of a center fascia of the vehicle, and moved rearward by a linkage operation thereof.

When the first, second, and third link members are moved rearward by a linkage operation, the link members may be stopped at one position so as to be fixed.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
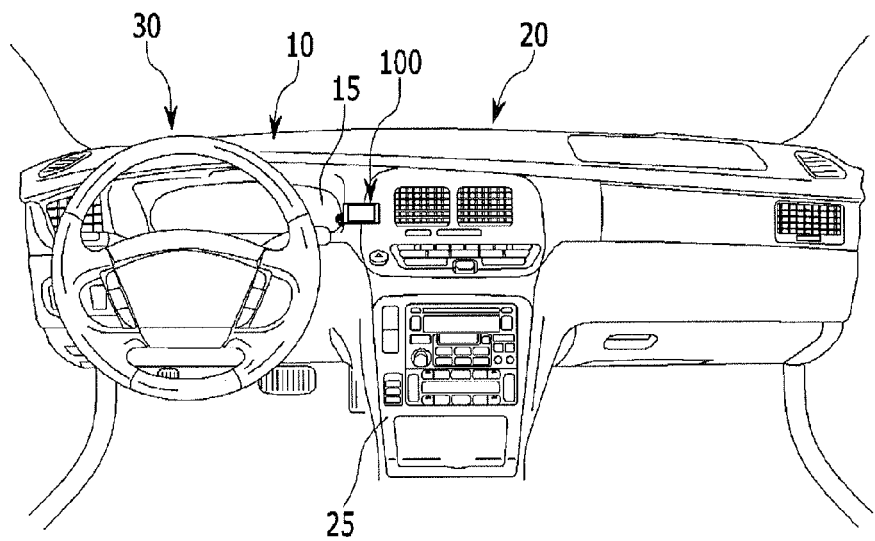
FIG. 1 is a perspective view of a dashboard having an exemplary smart phone holder according to the present invention.
Figure 2:
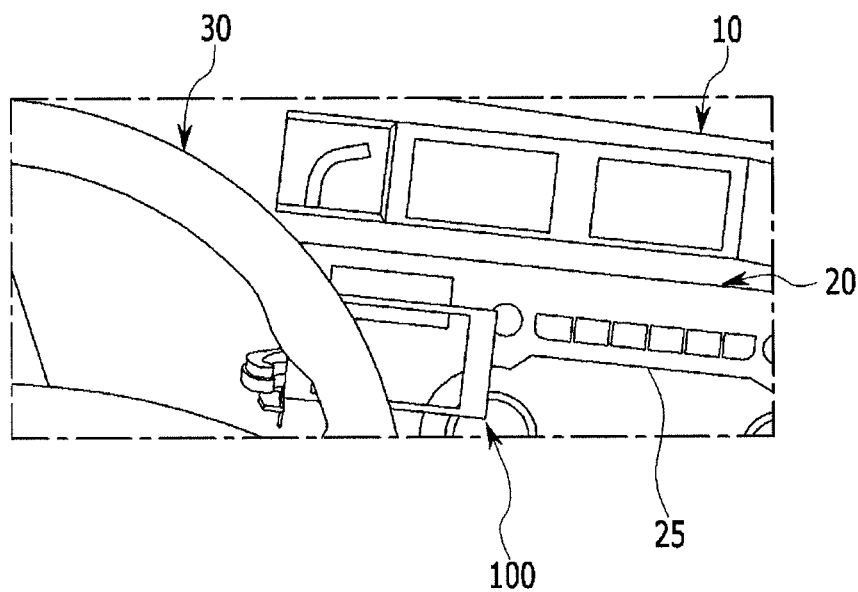
FIG. 2 is a perspective view of a dashboard having an exemplary smart phone holder according to the present invention.
Figure 3:
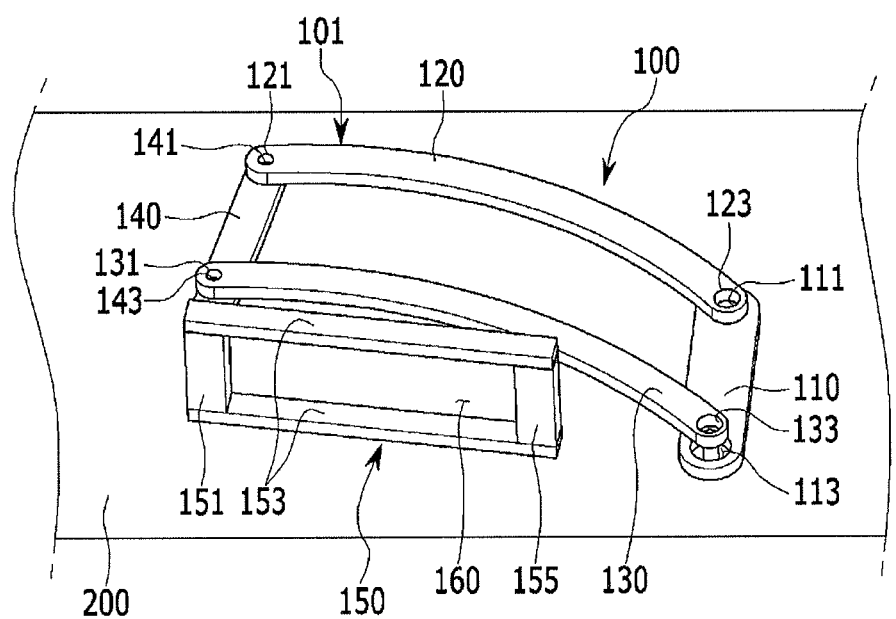
FIG. 3 is a first operation state perspective view of the present invention.
Figure 4:
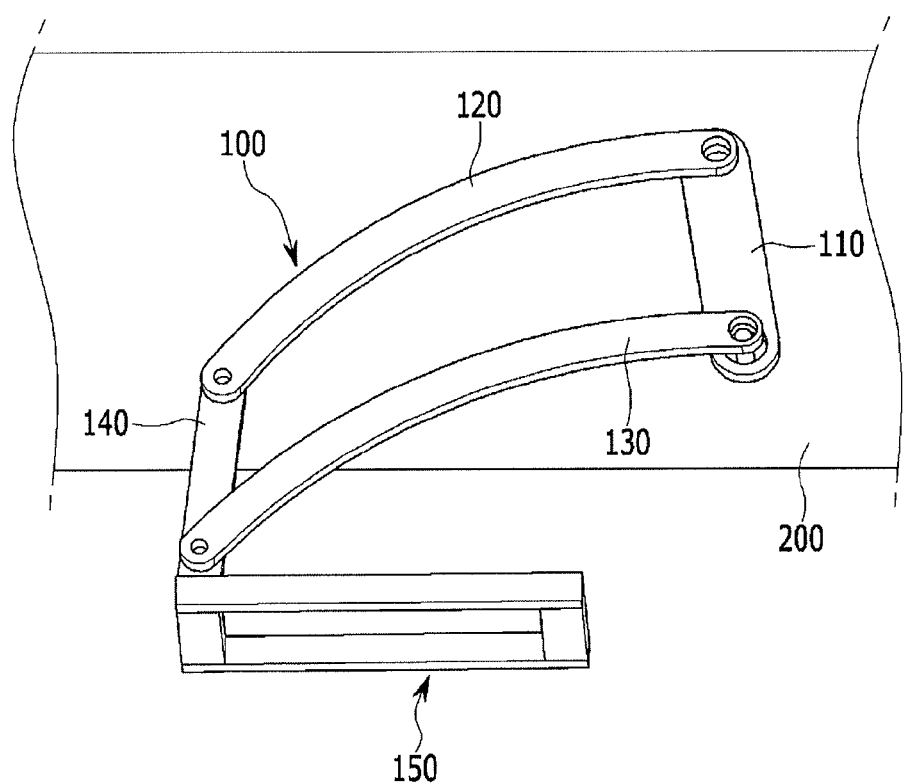
FIG. 4 is a second operation state perspective view of the present invention.
Figure 5:
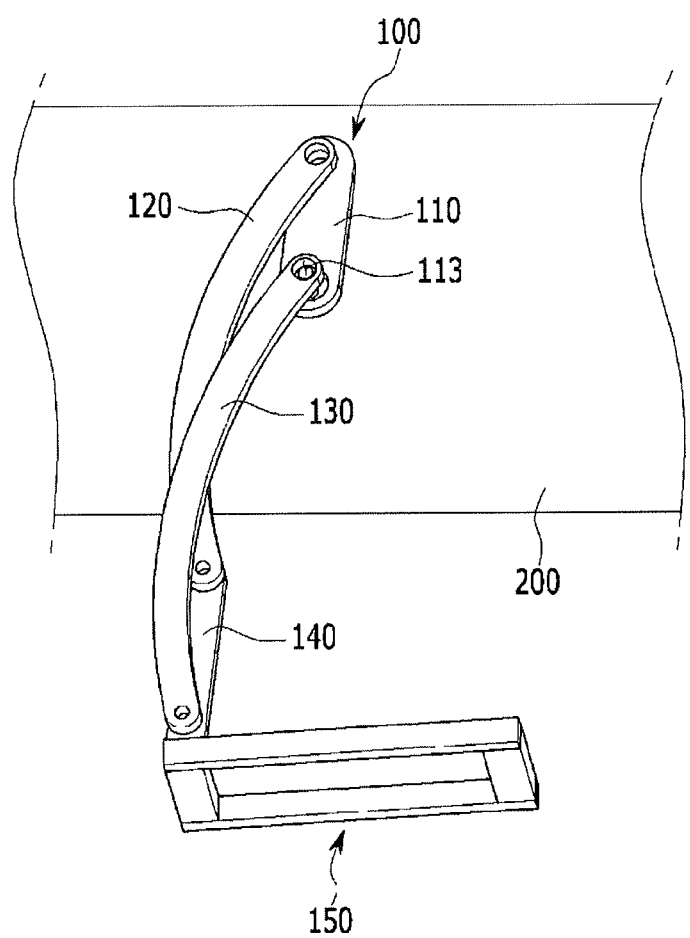
FIG. 5 is a third operation state perspective view of the present invention.

FIG. 1 is a perspective view of a dashboard having a smart phone holder according to various embodiments of the present invention, FIG. 2 is a perspective view of a dashboard having a smart phone holder according to various embodiments of the present invention, FIG. 3 is a first operation state perspective view of various embodiments of the present invention, FIG. 4 is a second operation state perspective view of various embodiments of the present invention, and FIG. 5 is a third operation state perspective view of various embodiments of the present invention.

Referring to FIGS. 1 to 5, an air conditioning module such as a heating, ventilation, air conditioning (HVAC) is connected to a cowl cross-member 200 (see FIG. 5.). The cowl cross-member 200 is extended in a width direction of a vehicle at a front side of the vehicle.

The cowl cross-member 200 is covered by a dashboard 20 in order to be unexposed to the outside.

The dashboard 20 is a partition that separates between a car interior and an engine compartment. The dashboard 20 includes a cluster 10 having a display portion 15 which provides vehicle state information at one side thereof, a center fascia 25 which is disposed between a driver seat and a passenger seat, and a steering wheel 30 which is configured to transfer torque generated from a driver to front wheels.

Referring to FIG. 3, a smart phone holder 100 according to various embodiments of the present invention may be mounted to the cowl cross-member 200 of the vehicle. However, it is not limited such that the smart phone holder 100 is only connected to the cowl cross-member 200. The smart phone holder 100 may be mounted to any fixed structure of the vehicle body at the front side of the vehicle.

The smart phone holder 100 includes a link member 101 and a mounting portion 150. The link member 101 may be formed as a four-node link apparatus which is moved frontward or rearward by a linkage operation thereof. Thereby, after the smart phone holder 100 is moved to a rear side, the smart phone may be conveniently installed to the smart phone holder 100 and be utilized at a close distance. As such, since the smart phone holder 100 is moved rearward, a dangerous behavior of the driver such as putting hands through the steering wheel 30 may be prevented. In addition, the four-node link structure of the link member 101 provides stable linkage operation and low friction when the link member 101 is operated in comparison with the other structures.

The smart phone holder 100 may be installed to the cowl cross-member 200 while the link member 101 and the mounting portion 150 may be unfolded to the rear side from the dashboard 20 of the vehicle. Referring to FIG. 1, the link member 101 and the mounting portion 150 according to various embodiments of the present invention are disposed inside of the cluster 10 and are moved to the rear side by the linkage operation. As shown in FIG. 2, the smart phone holder 100 according to various embodiments of the present invention may be moved from one surface of the center fascia 25 to the rear side.

In this way, since the smart phone holder 100 is configured to move from inside of the cluster 10 or center fascia 25 to the rear side, it is possible to prevent sunlight from arriving at the display of the smart phone. Thus, the visibility may be improved. Particularly, if the smart phone holder 100 is configured to protrude from inside of the cluster 10, then driver's recognition speed of the smart phone which is connected to the smart phone holder 100 is just 0.2 seconds. Thus, it is advantageous in visibility compared to the conventional way in which the smart phone holder is mounted to the center of the center fascia or an upper side portion of the dashboard.

The link member 101 includes a fixing link 110, a first link member 120, a second link member 130, and a third link member 140.

The fixing link 110 is fixedly mounted to the fixed structure of a vehicle body at the front side of the vehicle. According to various embodiments, the fixing link 110 is mounted to the cowl cross-member 200 so as to be fixed, and is extended in a length direction of the vehicle. Thus, the first link member 120 and the second link member 130 which are hinge-connected to the fixing link 110 may be rotated around the fixing link 110 and moved to the front or rear side.

Both end portions of the first link member 120 are provided with a first engaging hole 121 and a second engaging hole 123, and the second engaging hole 123 may be hinge-connected to a first fixing link hole 111 which is formed at one side portion of the fixing link 110. Thus, the first link member 120 may be rotated with reference to the fixing link 110 to form a certain trajectory.

In this specification, a pin is inserted between the engaging hole and the link hole for hinge-connection of links. However, it is not limited thereto. In other words, any connection means for hinge-connection of each link may be applicable unless specifically stated otherwise.

Both end portions of the second link member 130 have a third engaging hole 131 and a fourth engaging hole 133, and the fourth engaging hole 133 is hinged-connected to a second fixing link hole 113 which is formed at the other side of the fixing link 110. The second link member 130 is disposed to be spaced apart from the first link member 120, and the second link member 130 may be rotated with the first link member 120 and be moved at the front side or the rear side.

Referring to FIGS. 3 to 5, the second link member 130 is disposed at the upper side of the first link member 120 in a height direction of the vehicle. Thereby, as shown in FIG. 5, when in a state such that the first link member 120 and the second link member 130 is moved at the rear side, the first link member 120 may be overlapped with the second link member 130 at the lower side of the second link member 130. However, an arrangement of the first link member 120 and the second link member 130 is not limited thereto. The position of the first link member 120 and the second link member 130 may be changed.

Further, the lengths of the first link member 120 and the second link member 130 are almost equal or equal to each other.

Moreover, the first and second link members 120 and 130 are respectively formed in a circular arc shape. Therefore, as shown in FIG. 5, when the first link member 120 is fully rotated rearward, it does not meet the second fixing link hole 113.

Both end portions of the third link member 140 have a fifth engaging hole 141 and a sixth engaging hole 143. The fifth and sixth engaging holes 141 and 143 are hinge-connected to the first and third engaging holes 121 and 131 formed at each end portion of the first link member 120 and the second link member 130.

Therefore, while each of the link members 120 and 130 is rotated, the third link member 140 may be rotated and be moved to the front side or the rear side. Meanwhile, the third link member 140 is arranged so as to be substantially parallel to the fixing link 110. While each of the link members 120 and 130 is rotated, the direction thereof may be substantially maintained. In addition, the other side end of the third link member 140 is provided with a mounting portion 150 which is extended in a width direction of a vehicle.

The mounting portion 150 is configured to support a smart phone. Particularly, when the smart phone is coupled to the mounting portion 150, the mounting portion 150 is disposed such that a display of the smart phone faces the rear side. For example, the mounting portion 150 may include a pair of vertical members 151 and 155 which are extended in the height direction of the vehicle and a pair of horizontal members 153 which are extended in the width direction of the vehicle. Thus, a mounting hole 160 may be formed.

Each of the vertical members 151 and 155 and a pair of horizontal members 153 may support and fix a rear surface of the smart phone in various manners. For instance, the vertical members 151 and 155 and the horizontal member 153 may have a cradle which is protruded toward the front side or the rear side and the cradle may support the smart phone. In addition, the cradle may have an elastic member in order to firmly fix the smart phone. Further, the vertical members 151 and 155 and the horizontal member 153 may have Velcro, thus the smart phone with Velcro may be fixed thereto. Since these fixing methods are obvious to a person of ordinary skill in the art, a detailed description is omitted herein.

The mounting portion 150 may be integrally formed with the third link member 140 or separately produced and assembled with the third link member 140. In addition, while the third link member 140 is moved rearward or frontward by linkage operation, the mounting portion 150 may be disposed to be perpendicular to the third link member 140 such that the display of the smart phone faces rearward at all times.

Therefore, while each of the link members 120, 130, and 140 are rotated and moved frontward or rearward by linkage operation, the mounting portion 150 may be kept facing the same direction. For example, the third link member 140 may be generally kept in a same direction of the length direction of the vehicle like the direction of the fixing link 110. In this way, if the third link member 140 is disposed in a length direction of the vehicle, the mounting portion 150 which is perpendicular to the third link member 140 is disposed to be kept in the width direction of the vehicle. Therefore, the user of the smart phone may watch a front surface of display which is mounted to the mounting portion 150 at all times.

Operational states of the smart phone holder according to various embodiments will be described below referring to FIGS. 3 to 5.

FIG. 3 is a first operation state perspective view of various embodiments of the present invention. In the first operation state, the first and second link members 120 and 130 are disposed to face the rear side of the vehicle. For example, the first and second link members 120 and 130 may be disposed inside of the cluster 10 to contact or to be spaced apart from a front surface of the cluster 10.

FIG. 4 is a second operation state perspective view of various embodiments of the present invention. In the second operation state, the first and second link members 120 and 130 may be rotated around the fixing link 110 respectively, and then the mounting portion 150 may be moved to the rear side. At this time, a moving distance of the mounting portion from the front side to the rear side is larger than a distance in the width direction. Thus, interference of the display portion in the cluster may be minimized.

In addition, since the first and second link members 120 and 130 may be disposed to be spaced apart from each other and lengths thereof are almost equal to each other, the first and second link members 120 and 130 may be rotated in a linear trajectory in an early linkage operation. However, the first link member 120 cannot follow the second link member 130 at a certain rotation angle. Thereby, the third link member 140 which is connected to the third link member 140 is moved to the rear side and maintains the trajectory of the second link member 130.

FIG. 5 is a third operation state perspective view of various embodiments of the present invention. In the third operation state, the first link member 120 is moved and disposed at a lower side of the second link member 130. Therefore, the first link member 120 and the second link member 130 may be overlapped with each other. When the second link member 130 is fully moved to the rear side of the vehicle, then a total length of forward movement of the first link member 120 and the fixing link 110 is the same as a total length of the first link member 120 and the third link member 140. For this reason, the second link member 130 is not rotated any more in a clockwise direction of the drawing, and the first, second, and third link members 120, 130, and 140 may be structurally fixed. Meanwhile, when the smart phone holder 100 is link-operated, a movement of the third link member 140 may be minimized. Thus, the smart phone which is coupled to the mounting portion 150 may be maintained in a position facing the rear side in general. When the smart phone holder 100 is operated, the mounting portion 150 may be disposed at the other side of the steering wheel 30. Therefore, the visibility may be improved.

Since the smart phone holder 100 is connected to the vehicle body, an environment for a smart phone replacing the audio, video, and navigation (AVN) system is provided. If the AVN system is replaced with the smart phone, a space for the AVN system may be changed to an HVAC (heating, ventilating, and air conditioning) control portion by disposing it upward. Therefore, the operation of the HVAC control portion may be convenient, and the cost for the AVN may be reduced.

As described above, since the smart phone holder 100 according to various embodiments of the present invention may be mounted to the cowl cross-member 200 and moved rearward from the inside of the cluster 10 or dashboard 20, light reflection may be minimized. Thus, visibility of the smart phone is improved and distance and time for recognizing the smart phone are also decreased, and a dangerous behavior of the driver such as putting hands through the steering wheel 30 may be prevented.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A smart phone holder which is mounted to a fixed structure of a vehicle body at a front side of a vehicle to support a smart phone, the smart phone holder comprising:
    a fixing link fixedly mounted to the fixed structure of the vehicle body; and
    first, second, and third link members forming a four linkage structure with the fixing link together,
    wherein one end portion of each of the first and second link members are respectively hinge-connected to both ends of the fixing link to be rotatable, and
    wherein the first, second and third link members is configured to move the smart phone frontward or rearward of the vehicle by a linkage operation thereof.

2. The smart phone holder of claim 1, wherein while the first, second, and third members are link-operated, the smart phone which is coupled thereto generally faces a corresponding direction.

3. The smart phone holder of claim 2, wherein while the first and second link members are rotated, the third link member is generally maintained in one direction.

4. The smart phone holder of claim 3, wherein the third link member comprises a mounting portion in which the smart phone is coupled, and the mounting portion is fixed to the third link member and has a predetermined angle compared with the third link member.

5. The smart phone holder of claim 4, wherein the mounting portion is integrally formed with the third link member.

6. The smart phone holder of claim 4, wherein the second link member is disposed at an upper side or a lower side of the first link member.

7. The smart phone holder of claim 6, wherein the first link member and the second link member are respectively formed in an arc shape.

8. The smart phone holder of claim 7, wherein the first link member and the second link member are equal in length.

9. The smart phone holder of claim 4, wherein when the first, second, and third link members are moved rearward, the mounting portion is disposed at a side of a steering wheel.

10. The smart phone holder of claim 9, wherein the first, second, and third link members are configured to be operated at an inside of a cluster of the vehicle and moved rearward by a linkage operation thereof.

11. The smart phone holder of claim 9, wherein the first, second, and third link members are configured to be operated at a lower side of a cluster and one side of a center fascia of the vehicle, and moved rearward by a linkage operation thereof.

12. The smart phone holder of claim 9, wherein when the first, second, and third link members are moved rearward by a linkage operation, the link members are stopped at one position so as to be fixed.

* * * * *